United States Patent [19]

Cumberledge et al.

[11] Patent Number: 5,262,637

[45] Date of Patent: Nov. 16, 1993

[54] REPROGRAPHIC MEDIA DETECTOR AND METHODS FOR MAKING AND USING

[75] Inventors: William S. Cumberledge, Scottsdale; Damon L. Morgan, Phoenix, both of Ariz.

[73] Assignee: Motorola, Inc., Schaumburg, Ill.

[21] Appl. No.: 926,201

[22] Filed: Aug. 7, 1992

[51] Int. Cl.[5] .............................................. G01N 9/04
[52] U.S. Cl. .................................. 250/223 R; 271/258
[58] Field of Search ............... 250/561, 548, 557, 570, 250/223 R, 221, 222.1; 271/258

[56] References Cited

U.S. PATENT DOCUMENTS 3,461,302  8/1969  Benson et al. ...................... 250/548

*Primary Examiner*—David C. Nelms
*Attorney, Agent, or Firm*—Joe E. Barbee

[57] ABSTRACT

A reprographic media detector having a source of electromagnetic radiation (12) aimed at a reflector (17) is provided. A first detector (13) is positioned near the paper path for detecting electromagnetic radiation reflected from the reflector and a first portion of the paper path. A second detector (14) is positioned near the paper path for detecting electromagnetic radiation reflected from the reflector and a second portion of the paper path. Outputs of the first detector (13) and the second detector (14) are differentially amplified to produce an output signal indicating when an edge of a media sheet is illuminated by the source of electromagnetic radiation (12).

13 Claims, 1 Drawing Sheet

REPROGRAPHIC MEDIA DETECTOR AND METHODS FOR MAKING AND USING

BACKGROUND OF THE INVENTION

The present invention relates, in general, to solid state sensors, and more particularly, to solid state sensors for detecting a presence of reprographic media in a printer using reflected electromagnetic radiation.

Optical sensors, including combinations of light emitting diodes (LEDs) and photodiode detectors are used to detect paper in printing machines such as xerographic copiers and laser printers. Currently available systems use a single LED aimed at a portion of a paper path where a sheet of paper travels. Usually only a single detector is used to detect a change in the quantity of light reflected from or transmitted through the sheet of paper. An example of such a system is shown in U.S. Pat. No. 4,983,854 issued to Toshiaki Mizuno et al on Jan. 8, 1991.

Since the single detector only responds to a change in reflectivity, the reflectivity contrast between a "paper present" and a "paper absent" condition must be significant. While such systems are adequate for detecting white paper against a dark background, they are less reliable when detecting dark or colored paper. Moreover, it is virtually impossible to detect a transparent sheet of reprographic media, commonly used for overhead projection. One solution to these difficulties is to add a leader strip of solid paper to one edge of the transparent sheet, increasing cost of the media.

What is needed is a reprographic media detector that reliably detects a sheet of media regardless of reflectivity, color, or transparency.

SUMMARY OF THE INVENTION

Briefly stated, the present invention is achieved by a reprographic media detector including a source of electromagnetic radiation positioned on a first side of a sheet path and aimed at a reflector located on a second side of the sheet path. A first detector is positioned to detect electromagnetic radiation reflected from the reflector and a first portion of the sheet path. A second detector similar to the first detector is positioned adjacent to the first detector to detect electromagnetic radiation reflected from the reflector and a second portion of the sheet path.

In a method for making a reprographic media detector in accordance with the present invention, a source of electromagnetic radiation is positioned on a first side of sheet path and a reflector is positioned on a second side of the sheet path. The source of electromagnetic radiation is angled sufficiently to allow the electromagnetic radiation to travel through a region of the sheet path and reflect from the reflector. First and second detectors for detecting the reflected electromagnetic radiation are positioned adjacent to each other and at a location sufficient to allow substantially equal quantities of the reflected light to fall on the first and second detectors. In normal operation, both detectors have light reflected onto them at all times.

In a method for using a reprographic media detector in accordance with the present invention a region of a sheet path is illuminated by a light source located on a first side of the sheet path. A reflector is positioned on a second side of the sheet path. The light at least partially reflects from the sheet path or from a reflector. A first signal is generated that is a function of a quantity of light reflected from the reflector and a first portion of the sheet path. A second signal is generated that is a function of a quantity of light reflected from the reflector and a second portion of the sheet path. The first and second signals are differentially amplified. When no paper is present, the first and second signals are identical and no difference signal is generated. When an edge of a sheet of reprographic media is in the illuminated region of the sheet path, however, the first and second signals are not identical and a difference signal is generated by the differential amplification.

DETAILED DESCRIPTION OF THE DRAWINGS

Figure 1:
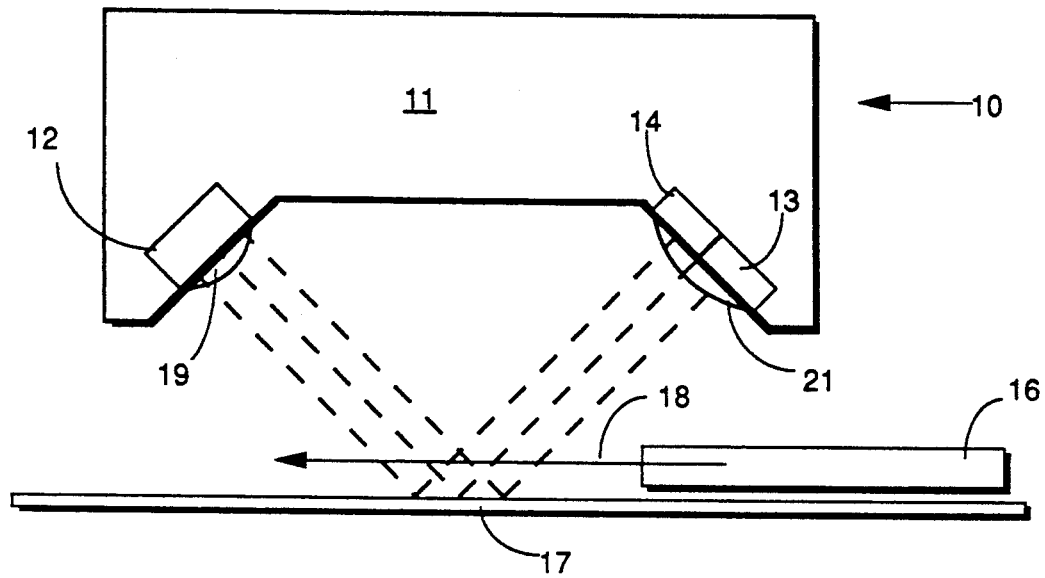
FIG. 1 is a highly simplified cross-section view of a portion of a system using a reprographic media detector in accordance with the present invention.

FIG. 1 illustrates a highly simplified cross-section view of a portion of a system using a reprographic media detector in accordance with the present invention. The system shown in FIG. 1 is useful in particular for monitoring the presence or absence of media sheet 16, but it will be apparent that the present invention is also useful for detecting other traveling objects, and for monitoring changes in reflectivity of a sheet of media such as caused by colors or printing.

In the embodiment shown in FIG. 1, media sheet 16 includes a leading edge as it travels in a direction suggested by the arrow 18 in FIG. 1. Media sheet 16 travels in what is usually called a "paper path" or more generically called a "sheet path" because media sheet 16 may comprise paper, transparent film, or the like. For ease of description, the direction of paper travel shown by arrow 18 in FIG. 1 is referred to as sheet path 18.

A reflective-type optical sensor 10 is shown housed in a single housing 11, although discrete components may be used. A source of electromagnetic radiation 12 is positioned at an angle to emit energy in the direction of sheet path 18. A reflector 17 forms a background of sheet path 18. Reflector 17 can be any shape so long as the wavelength of radiation produced by source 12 is chosen to at least partially reflect from the surface of reflector 17 onto detectors 13 and 14. In a preferred embodiment source 12 comprises a light emitting diode (LED) emitting energy in the infrared portion of the electromagnetic spectrum. As shown by the dashed lines in FIG. 1, a transmission path exists between source 12 and reflector 17.

The emitted energy can pass through optional lens 19 which is used to aim, focus, or collimate the electromagnetic energy. When used, lens 19 is located in the transmission path between source 12 and sheet path 18. In applications where source 12 can be located close enough to the sheet path 18, lens 19 is usually not required.

The emitted energy illuminates a region of sheet path 18 and in the absence of media sheet 16 reflects from reflector 17 towards detectors 13 and 14. As shown by the dashed lines in FIG. 1, a reflection path exists between the surface being monitored of media sheet 16 and detectors 13 and 14. Detectors 13 and 14 are chosen to be sensitive to the wavelength of radiation emitted from source 12, and are positioned adjacent to each other. In the preferred embodiment, detectors 13 and 14 are positioned at an angle to maximize the quantity of reflected light that reaches them, and are located so that substantially the same quantity of light falls on each detector except when an edge of media sheet 16 is in the illuminated region of sheet path 18. Detectors 13 and 14 can be provided by discrete components such as photodiodes, phototransistors, photodarlingtons or the like. In the preferred embodiment they comprise two phototransistors formed on a single monolithic semiconductor substrate to ensure matched performance.

The reflected energy can pass through optional lens 21 which is used to aim, focus, or collimate the reflected electromagnetic energy. Lens 21 is positioned in the reflection path between sheet path 18 and detectors 13 and 14. In applications where detectors 13 and 14 can be located close enough to sheet path 18, lens 21 is usually not required.

In operation, detectors 13 and 14 are constantly bathed in electromagnetic energy reflected from the surface of reflector 17 or media sheet 16. While only reflector 17 is illuminated, both detector 13 and detector 14 receive approximately equal quantities of energy, and produce a closely matched output. Similarly, when only media sheet 16 is illuminated, both detector 13 and detector 14 receive approximately equal quantities of energy, and produce a closely matched output.

As an edge of media sheet 16 travels through the illuminated portion of sheet path 18, however, one of detectors 13 or 14 will momentarily receive a greater quantity of light than the other. As media sheet 16 continues to travel through sheet path 18, this imbalance in reflected energy travels across the surface of detectors 13 and 14 creating an equal and opposite response at a moment later in time.

Figure 2:
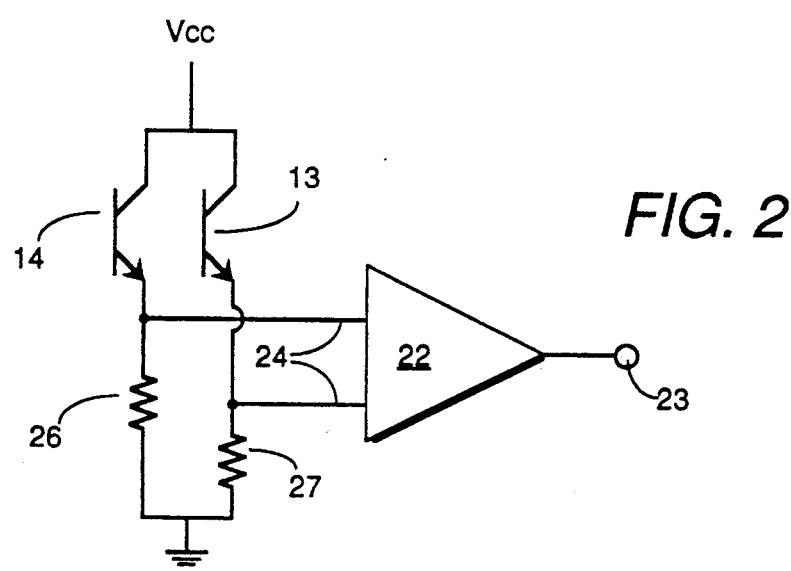
FIG. 2 is a schematic drawing illustrating a method of using the reprographic media detector shown in FIG. 1.

As shown in FIG. 2, each of detectors 13 and 14 create an output voltage across resistors 27 and 26, respectively. In a preferred embodiment, detector 13 is coupled to one input 24 of a differential amplifier 22, and to a ground or common potential through resistor 27. Detector 14 is coupled to another input 24 of differential amplifier 22 and to a ground or common potential through resistor 27. Differential amplifier 22 may comprise any of a number of well known circuits that differentially amplify or compare two input signals and produce an output 23 that is a function of the difference between the two inputs. Differential amplifier is optionally formed on the same monolithic semiconductor substrate as detectors 13 and 14.

It should be noted that if detectors 13 and 14 have sufficiently matched characteristics and high gain, as in the case of some phototransistors and photodarlingtons, they can be coupled as a differential amplifier. This eliminates need for a separate differential amplifier 22 and may provide adequate performance for some applications.

As long as detectors 13 and 14 receive substantially the same quantity of reflected energy, their outputs will be substantially equal and output 23 produces a constant signal. As described above, when an edge of media sheet 16 (shown in FIG. 1) is illuminated by source 12 (shown in FIG. 1) a brief pulse is produced at output 23 because of the imbalance in light received by detectors 13 and 14. A moment later, a second pulse of opposite polarity from the first pulse is generated at output 23.

A number of useful functions are possible for the reprographic media monitor in accordance with the present invention. For example the speed of media sheet 16 can be measured. Output 23 produces a signal when the leading edge and when a trailing edge (not shown) of sheet 16 pass through the illuminated portion of paper path 18. Using the two signals from output 23, speed can be calculated by measuring the time delay from the first pulse to the second pulse when the size of sheet 16 is known. Alternatively, when the speed of sheet 16 is known, size of sheet 16 can easily be calculated. Another useful function includes monitoring the amplitude of the pulses at output 23 to determine media type or color. Because the outputs of the two detectors are differentially amplified, the magnitude of output 23 more reliably indicates the difference in reflectivity caused by the imposition of media sheet 16 onto reflector 17 than is possible with a single detector.

Because of this increased sensitivity, the reprographic media detector in accordance with the present invention can actually detect light and dark regions printed on media sheet 16. For example, a bar code can be read, or the output signal monitored to detect if the paper being printed already contains an image and signal the printing machine to respond accordingly.

By now it should be appreciated that a reprographic media detector and method for making and using it are provided. The structure in accordance with the present invention provides two detector outputs that are differentially amplified to produce an output that is sensitive an edge of a sheet of media passing through a sheet path. The design of signal conditioning circuitry makes the signal generated much more immune to variations caused by surface reflectivity, transparency and finish as well as ambient lighting. Moreover, this signal conditioning circuitry produces a high signal to noise ratio output that is sensitive to small reflectivity changes.

We claim:

1. A reprographic media detector comprising: a sheet path; a source of electromagnetic radiation positioned on a first side of the sheet path and aimed towards the sheet path; a reflector located on a second side of the sheet path, wherein the reflector is at least partially reflective of the electromagnetic radiation; a first detector positioned on the first side of the sheet path for receiving electromagnetic radiation reflected from the reflector; a second detector positioned on the first side of the sheet path and adjacent to the first detector for detecting electromagnetic radiation reflected from the reflector.

2. The reprographic media detector of claim 1 further comprising a lens positioned in a transmission path between the source and the sheet path.

3. The reprographic media detector of claim 1 further comprising a lens positioned in a reflection path between the sheet path and the first and second detectors.

4. The reprographic media detector of claim 1 wherein the first and second detectors are positioned to receive substantially equal quantities of electromagnetic energy from the reflector.

5. The reprographic media detector of claim 1 further comprising a differential amplifier having a first input, a second input, and an output that produces a signal proportional to the difference between the first input and the second input, wherein the first detector is coupled to the first input and the second detector is coupled to the second input.

6. The reprographic media detector of claim 1 wherein the first and second detectors comprise phototransistors.

7. The reprographic media detector of claim 6 wherein the first and second detectors are formed on a single monolithic semiconductor device.

8. A method for using a reprographic media detector comprising the steps of: providing a sheet path, wherein a sheet of reprographic media travels in the sheet path; providing a light source on a first side of the sheet path for generating electromagnetic energy; providing a reflector on a second side of the sheet path; illuminating a region of the sheet path with the light source, wherein the wavelength and angle of the light source are chosen to at least partially reflect from the reflector; generating a first signal that is a function of a quantity of radiation reflected from the reflector and a first portion of the sheet path; generating a second signal that is a function of a quantity of light reflected from the reflector and a second portion of the sheet path; and differentially amplifying the first and second signals to generate a difference signal when an edge of a sheet of reprographic media is in the illuminated region of the sheet path.

9. The method of claim 8 further comprising the step of collimating the electromagnetic radiation before the step of illuminating the portion of the sheet path.

10. The method of claim 8 wherein the wavelength is in the infrared portion of the electromagnetic spectrum.

11. The method of claim 8 wherein the first and second signals are substantially equal when the illuminated portion of the sheet path does not contain an edge of a sheet of reprographic media.

12. A method for making a reprographic media detector comprising the steps of: providing a source of electromagnetic radiation located on a first side of a sheet path; providing a reflector located on a second side of the sheet path; positioning the source of electromagnetic radiation at a first predetermined angle, wherein the first predetermined angle is sufficient to allow the electromagnetic radiation to travel through a region of the sheet path and reflect from reflector; providing a first detector for detecting electromagnetic radiation reflected from the reflector; providing a second detector for detecting the electromagnetic radiation reflected from the reflector; and positioning the first and second detectors adjacent to each other and at a location sufficient to allow substantially equal quantities of the reflected light to fall on the first and second detectors.

13. The method of claim 12 further comprising the steps of: providing a differential amplifier having a first input, a second input, and an output that produces a signal proportional to the difference between the first input and the second input; coupling the first detector to the first input; and coupling the second detector to the second input.

* * * * *